(12) United States Patent
Xu et al.

(10) Patent No.: US 10,701,564 B2
(45) Date of Patent: Jun. 30, 2020

(54) SIGNAL RETRANSMISSION APPARATUS AND METHOD AND COMMUNICATION SYSTEM

(71) Applicant: FUJITSU CONNECTED TECHNOLOGIES LIMITED, Kawasaki-shi, Kanagawa (JP)

(72) Inventors: Yueqiao Xu, Beijing (CN); Hongchao Li, Beijing (CN); Hua Zhou, Beijing (CN)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

(21) Appl. No.: 15/272,917

(22) Filed: Sep. 22, 2016

(65) Prior Publication Data
US 2017/0013466 A1   Jan. 12, 2017

Related U.S. Application Data

(63) Continuation of application No. PCT/CN2014/074468, filed on Mar. 31, 2014.

(51) Int. Cl.
*H04W 16/10* (2009.01)
*H04L 1/18* (2006.01)
(Continued)

(52) U.S. Cl.
CPC ........... *H04W 16/10* (2013.01); *H04L 1/1893* (2013.01); *H04W 72/0453* (2013.01); *H04W 92/18* (2013.01)

(58) Field of Classification Search
CPC . H04W 16/10; H04W 72/0453; H04W 92/18; H04L 1/1893
See application file for complete search history.

(56) References Cited

U.S. PATENT DOCUMENTS

| 8,121,097 B2 | 2/2012 | Li et al. |
| 8,463,238 B2 | 6/2013 | Forstall et al. |
| (Continued) | | |

FOREIGN PATENT DOCUMENTS

| CN | 102204293 A | 9/2011 |
| CN | 103368706 A | 10/2013 |
| (Continued) | | |

OTHER PUBLICATIONS

Office Action issued by the Canadian Intellectual Property Office for corresponding Canadian Patent Application No. 2,943,427, dated Jul. 25, 2017.

(Continued)

*Primary Examiner* — Ajay Cattungal
(74) *Attorney, Agent, or Firm* — Myers Wolin, LLC

(57) ABSTRACT

Embodiments of the present disclosure provide a signal retransmission apparatus and method and a communication system. The method includes: a first UE determines a resource for retransmitting a signal according to a resource for initially transmitting the signal and a frequency hopping pattern; and retransmits the signal to a second UE according to the determined resource. With the embodiments of the present disclosure, interference between UEs may be randomized as possible, and complexity of blind detection by receiver end UE may be lowered as possible.

13 Claims, 4 Drawing Sheets

(51) Int. Cl.
H04W 72/04 (2009.01)
H04W 92/18 (2009.01)

(56) References Cited

U.S. PATENT DOCUMENTS

| | | | | |
|---|---|---|---|---|
| 8,811,313 | B2* | 8/2014 | Papasakellariou .... | H04W 72/02 370/329 |
| 9,374,131 | B2* | 6/2016 | Chen ................... | H04B 1/7143 |
| 2010/0110929 | A1* | 5/2010 | Li ........................ | H04B 1/7143 370/254 |
| 2010/0240312 | A1 | 9/2010 | Peng et al. | |
| 2011/0007779 | A1* | 1/2011 | Nanri ................... | H04B 1/715 375/133 |
| 2012/0263142 | A1* | 10/2012 | Ahn ..................... | H04B 1/7143 370/330 |
| 2012/0307869 | A1 | 12/2012 | Charbit et al. | |
| 2013/0010661 | A1 | 1/2013 | Esteves et al. | |
| 2013/0044699 | A1* | 2/2013 | Eriksson ............. | H04W 72/1289 370/329 |
| 2014/0003262 | A1 | 1/2014 | He et al. | |
| 2014/0269558 | A1* | 9/2014 | Sartori ................. | H04W 48/16 370/329 |
| 2015/0030011 | A1* | 1/2015 | Liu ...................... | H04L 1/1893 370/336 |
| 2015/0031410 | A1* | 1/2015 | Lim ..................... | H04W 52/146 455/522 |
| 2016/0381708 | A1* | 12/2016 | Li ........................ | H04W 72/085 370/330 |

FOREIGN PATENT DOCUMENTS

| | | |
|---|---|---|
| CN | 103517276 A | 1/2014 |
| CN | 103648103 A | 3/2014 |
| CN | 103686691 A | 3/2014 |
| JP | 2012-507974 A | 3/2012 |
| RU | 2503153 C2 | 12/2013 |
| WO | 2013/155901 A1 | 10/2013 |

OTHER PUBLICATIONS

Extended European search report with supplementary European search report and the European search opinion issued by the European Patent Office for corresponding European Patent Application No. 14888336.6, dated Oct. 9, 2017.
Notification of Reasons for Refusal issued by the Japan Patent Office for corresponding Japanese Patent Application No. 2016-559432, dated Nov. 7, 2017, with an English translation.
NTT Docomo, Inc., "Views on D2D discovery resource allocation", Agenda Item: 6.2.8.2.2, 3GPP TSG-RAN WG1 Meeting #75, R1-135522, San Francisco, USA, Nov. 11-15, 2013.
Alcatel-Lucent Shanghai Bell et al., "D2D channel design for broadcast communication", Agenda Item: 71.7.1.1, 3GPP TSG-RAN WG1 Meeting #76bis, R1-141252, Shen Zhen, China, Mar. 31-Apr. 4, 2014.
Qualcomm Incorporated, "Details of Scheduling Assignment for D2D broadcast communication", Agenda Item: 7.4.2, 3GPP TSG-RAN WG2 Meeting #85Bis, R2-141686, Valencia, Spain, Mar. 31-Apr. 4, 2014.
First Office Action issued by Rospatent Federal Service for Intellectual Property for corresponding Russian Patent Application No. 2016142353/07(067834), dated Nov. 15, 2017, with an English translation.
Search Report issued by Rospatent Federal Service for Intellectual Property for corresponding Russian Patent Application No. 2016142353/07(067834), dated Nov. 15, 2017, with an English translation.
Catt, "Further discussion on resource allocation for D2D discovery", Agenda Item: 7.2.8.2.2, 3GPP TSG-RAN WG1 Meeting #76, R1-140098, Prague, Czech Republic, Feb. 10-14, 2014.

International Search Report issued for corresponding International Patent Application No. PCT/CN2014/074468, dated Jul. 9, 2014, with an English translation.
Notice of Preliminary Rejection issued by the Korean Intellectual Property Office for corresponding Korean Patent Application No. 10-2016-7027176, dated Oct. 18, 2017, with English translation.
Ericsson, "D2D Physical Channels Design", Agenda Item: 7.2.7.1.1, 3GPP TSG-RAN WG1 Meeting #76bis, R1-141384, Shenzhen, China, Mar. 31-Apr. 4, 2014.
NTT Docomo, Inc., "Views on D2D discovery resource allocation", Agenda Item: 7.2.8.2.2, 3GPP TSG-RAN WG1 Meeting #76, R1-140630, Prague, Czech Republic, Feb. 10-14, 2013.
Office Action issued by the Canadian Intellectual Property Office for corresponding Canadian Patent Application No. 2,943,427, dated May 11, 2018.
Communication of the Substantive Examination Report issued for corresponding Mexican Patent Application No. MX/a/2016/012351 dated Jan. 24, 2018, with an English translation.
Notice of Preliminary Rejection issued by the Korean Intellectual Property Office for corresponding Korean Patent Application No. 10-2016-7027176, dated Aug. 27, 2018, with English translation.
Ericsson, "On resource allocation for D2D communication", Agenda Item: 7.2.7.2, 3GPP TSG-RAN WG1 Meeting #76bis, R1-141390, Shenzhen, China, Mar. 31-Apr. 4, 2014.
Alcatel-Lucent Shanghai Bell et al., "D2D communication channel design for broadcast", Agenda Item: 7.2.8.1.2, 3GPP TSG RAN WG1 meeting #76, R1-140173, Prague, Czech Republic, Feb. 10-14, 2014.
Mehari, "Frequency Hopping in LTE Uplink", Master Degree Thesis of BIT (Blekinge Institute of Technology), Mar. 2009.
First Notification of Office Action issued by the China National Intellectual Property Administration for corresponding Chinese Patent Application No. 201480076558.6, dated Jan. 2, 2019, with an English translation.
Communication pursuant to Article 94(3) EPC issued by the European Patent Office for corresponding European Patent Application No. 14 888 336.6-1207, dated Mar. 6, 2019.
The Second Office Action issued for corresponding Chinese Patent Application No. 201480076558.6, dated Aug. 23, 2019, with Full English-machine translation.
Notice of Preliminary Rejection issued for corresponding Korean Patent Application No. 10-2019-7018492, dated Aug. 14, 2019, with full English translation.
Decision of Rejection issued for corresponding Chinese Patent Application No. 201480076558.6, dated Mar. 4, 2020, with Full English-machine translation.
Trial and Appeal Decision issued by the Japan Patent Office for Appeal 2019-5761, for corresponding Japanese Patent Application No. 2016-559432, dated on Feb. 25, 2020, with an English translation.
Intel Corporation, "Link-level Analysis of LTE-based D2D Discovery Design", Agenda Item: 7.2.8.2, 3GPP TSG-RAN WG1 Meeting #74, R1-132943, Barcelona, Spain, Aug. 19-23, 2013.
LG Electronics, "Resource Allocation and UE Behavior for D2D Discovery", Agenda Item: 7.2.8.2.2, 3GPP TSG-RAN WG1 Meeting #75, R1-140337, Prague, Czech Republic, Feb. 10-14, 2014.
Intel Corporation, "Discussion on Resource Allocation Methods for D2D Communication", Agenda Item: 7.2.8.1.3, 3GPP TSG-RAN WG1 Meeting #74bis, R1-134139, Guangzhou, China, Oct. 7-11, 2013.
3GPP TS 36.213 V12.0.0, "3rd Generation Partnership Project; Technical Specification Group Radio Access Network; Evolved Universal Terrestrial Radio Access (E-UTRA); Physical layer procedures (Release 12)", Dec. 2013.
Dahlman et al, reference part of "3G Evolution Second edition HSPA and LTE for Mobile Broadband" (Original title); Translated by Takeshi Hattori et al (Maruzen Publishing Co., Ltd., 2009). Cited in Trial and Appeal Decision issued Feb. 25, 2020 for corresponding Japanese Application No. 2016-559432.

* cited by examiner

SIGNAL RETRANSMISSION APPARATUS AND METHOD AND COMMUNICATION SYSTEM

CROSS REFERENCE TO RELATED APPLICATIONS

This application is a continuation application of International Application PCT/CN2014/074468 filed on Mar. 31, 2014, the entire contents of which are incorporated herein by reference.

TECHNICAL FIELD

The present disclosure relates to the field of communications, and in particular to a signal retransmission apparatus and method and a communication system.

BACKGROUND

Studies of issues related to device to device (D2D) have begun by 3GPP RAN in an LTE system, which are intended to evaluate services between geographically neighboring devices in the LTE. D2D-related operations may include D2D discovery and D2D communications.

In the D2D discovery, a user equipment (UE) selects a resource from a configured resource pool to transmit a discovery signal. The discovery signal at least contains a discovery message, and may possibly contain discovery preamble information. According to current progress, it is proposed to repeatedly transmit a discovery message many times in a discovery period, so as to improve D2D discovery performance.

For example, in a discovery period, a discovery message carrying a discovery medium access control (MAC) protocol data unit (PDU) may be transmitted in a manner of repeated transmission, so as to improve a D2D discovery probability.

And on the other hand, another important subject of the D2D is the D2D communications. According to current discussion progress, when a D2D transmitter end UE transmits D2D broadcast data, the method of multiple times of retransmission is also used to improve channel quality.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

In the D2D discovery, when a discovery message is transmitted in the manner of repeated transmission, a resource selection method used by the D2D transmitter end UE in each time of repeated transmission needs to be specified in the specifications. According to the current discussion progress, two methods are provided: (1) randomly selecting a first portion of resources by the transmitter end UE from discovery resources that may be used for repeatedly transmitting discovery messages, that is, resources transmitted for a first time are randomly selected, and other subsequently repeatedly transmitted resources are determined by the first portion of resources; and (2) randomly selecting resources from the discovery resources by the transmitter end UE for each time of repeated transmission.

However, it was found by the inventors that in the above method (1), if the subsequently repeatedly transmitted resources are determined only by the first portion of resources, a problem may possibly occur that when the first portion of resources selected randomly by multiple D2D transmitter end UEs collide, resource collision will occur in the subsequently repeatedly transmitted D2D discovery messages. Hence, a relatively low probability of collision of discovery signals of multiple D2D UEs cannot be guaranteed.

And in the above method (2), it functions as a randomization effect between discovery signals of multiple transmitter end UEs to some extent. However, for a receiver end UE, it is difficult to achieve combination of multiple discovery signal copies, since the receiver end UE does not know a position of a resource where each of the discovery signal copies is located, and can only perform combination based on an assumption of a possible position of the resource where each of the discovery signal copies is located. Assuming that there exist N types of selection of available resources for each time of transmission of discovery signals, if M times of repeated transmission are needed, for the receiver end UE, a worst situation is that $N^M$ times of attempts are needed to correctly decode the discovery signals. Such a method in which resources are randomly selected in each time of transmission of discovery signal copies will greatly increase complexity of decoding and demodulation by the receiver end UE, thereby increasing power consumption.

Hence, in the D2D discovery, when D2D discovery messages are continuously or incontinuously repeatedly transmitted in a discovery period, an issue needing to be studied is selection of resources for transmitting discovery signal copies for the D2D transmitter end UE, that is, transmission of discovery signals by multiple D2D transmitter end UEs needs to be randomized on the one hand, and on the other hand, reception complexity of the D2D receiver end UE needs to be simplified. In the D2D communications, the problem of resource selection like that in the D2D discovery also exists.

Embodiments of the present disclosure provide a signal retransmission apparatus and method and a communication system. In determining resources for repeatedly transmitting signals, randomizing as possible interference between UEs and lowering complexity of blind detection by the receiver end UE are both taken into account.

According to a first aspect of the embodiments of the present disclosure, there is provided a signal retransmission method, applicable to a first UE, the method including:

determining a resource for retransmitting a signal according to a resource for initially transmitting the signal and a frequency hopping pattern; and retransmitting the signal to a second UE according to the determined resource.

According to a second aspect of the embodiments of the present disclosure, there is provided a signal retransmission apparatus, configured in a first UE, the apparatus including:

a resource determining unit configured to determine a resource for retransmitting a signal according to a resource for initially transmitting the signal and a frequency hopping pattern; and a signal transmitting unit configured to retransmit the signal to a second UE according to the determined resource.

According to a third aspect of the embodiments of the present disclosure, there is provided a signal retransmission method, applicable to a second UE, the method including:

receiving a signal retransmitted by a first UE; wherein a resource for retransmitting the signal is determined by the first UE according to a resource for initially transmitting a signal and a frequency hopping pattern.

According to a fourth aspect of the embodiments of the present disclosure, there is provided a signal retransmission apparatus, configured in a second UE, the apparatus including:

a signal receiving unit configured to receive a signal retransmitted by a first UE; wherein a resource for retransmitting the signal is determined by the first UE according to a resource for initially transmitting a signal and a frequency hopping pattern.

According to a fifth aspect of the embodiments of the present disclosure, there is provided a communication system, including:

a first UE configured to determine a resource for retransmitting a signal according to a resource for initially transmitting the signal and a frequency hopping pattern, and retransmit the signal according to the determined resource; and a second UE configured to receive the signal retransmitted by the first UE.

According to a further aspect of the embodiments of the present disclosure, there is provided a computer-readable program, wherein when the program is executed in a UE, the program enables the UE to carry out the signal retransmission method as described above.

According to a yet further aspect of the embodiments of the present disclosure, there is provided a storage medium in which a computer readable program is stored, wherein the computer readable program enables a UE to carry out the signal retransmission method as described above.

An advantage of the embodiments of the present disclosure exists in that determining the resource for retransmitting the signal according to the resource for initially transmitting the signal and the frequency hopping pattern may randomize as possible interference between UEs, and lower complexity of blind detection by the receiver end UE as possible.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated in size.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In this embodiment, transmission or retransmission (also referred to as repeated transmission) of signals is performed between two UEs, and the two UEs may perform D2D communications or D2D discovery. However, the present disclosure is not limited thereto. For example, it is also applicable to two UEs not performing a D2D operation, and a particular scenario may be determined according to an actual situation. Embodiments of the present disclosure shall be described below taking that two UEs performing D2D communications or D2D discovery perform signal retransmission as an example only.

Embodiment 1

Figure 1:
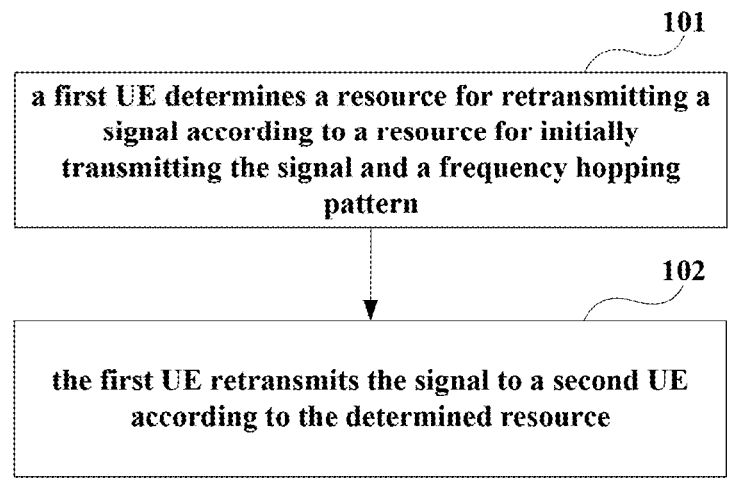
FIG. 1 is a flowchart of the signal retransmission method of Embodiment 1 of the present disclosure.

An embodiment of the present disclosure provides a signal retransmission method, applicable to a first UE side as a signal transmitter end. FIG. 1 is a flowchart of the signal retransmission method of this embodiment of the present disclosure. As shown in FIG. 1, the method includes:

step 101: a first UE determines a resource for retransmitting a signal according to a resource for initially transmitting the signal and a frequency hopping pattern; and step 102: the first UE retransmits the signal to a second UE according to the determined resource.

In this embodiment, the signal may be a discovery signal in D2D discovery, and may also be data in D2D communications, and the present disclosure is not limited thereto.

Furthermore, the frequency hopping pattern may be predetermined; the frequency hopping pattern may be cell-specific or common, and may also be UE-specific, and the present disclosure is not limited thereto.

For example, the frequency hopping pattern may also be of a hopping type of a physical uplink shared channel (PUSCH) in an existing specification. And the relevant art may be referred to for detailed contents of the frequency hopping pattern, which shall not be described herein any further.

In step 101, the frequency hopping pattern is related to one or more of the following factors: the resource for initially transmitting the signal, an index of a subframe where a corresponding signal retransmission/repeating event is located, and related ID information. The resource for retransmitting the signal may be determined according to information on the frequency hopping pattern. However, the present disclosure is not limited thereto, and factors related to the frequency hopping pattern may be determined according to an actual situation.

For example, the related ID information may be a common ID applicable to all UE, or a UE-specific ID; for example, it may be a cell ID, and may also be an ID of a transmission UE or a cell radio network temporary identifier (C-RNTI), etc. However, the present disclosure is not limited thereto, and particular information may be determined according to an actual situation.

As an example, in the D2D communications, an index of a resource used for an i-th time of retransmission may be expressed by following Formula (1) or (2); however, the present disclosure is not limited thereto.

$$n(i)=(n(0)+ID+f(i,j)) \bmod N \qquad (1),$$

or, $$n(n)=(n(0)+f(i,j,ID)) \bmod N \qquad (2);$$

where, n(0) denotes the index of the resource used for a first time of transmission of the signal, that is, an initial resource block (RB), n(i) denotes a position of the initial RB for this time of retransmission in a frequency domain, f(i, j) is a function of an index #j of the subframe where this time of retransmission is located, f(i, j, ID) is a function related to the index #j of the subframe where this time of retransmission is located and an ID, for example, the function is a pseudo-random sequence with its initial value being determined by the ID, N denotes the number of available resources in the frequency domain, i.e. the number of RBs, and ID denotes information on the ID of the transmission UE; based on a mode of the transmission UE (such as mode 1 or mode 2, as described below), the frequency hopping pattern may be in cell-specific or UE-specific form, that is, in repeatedly transmitting D2D signals, the transmission UEs with different modes use respective independent types of frequency hopping.

A type of frequency hopping used by the transmission UE with mode 1 is configured by a base station (such as an eNB), and in SA (Scheduling Assignment) transmitted by the transmission UE to a reception UE, the type of frequency hopping is informed to the reception UE. Hence, the transmission UE and the reception UE respectively transmit and receive data according to an identical type of frequency hopping. And the transmission UE with mode 2 selects a type of frequency hopping on its own, and in SA transmitted to the reception UE, the type of frequency hopping is informed to the reception UE.

For example, when the transmission UE adopts mode 1, the frequency hopping pattern is cell-specific, and the ID may be an ID of a serving cell where the UE is located, i.e. a cell ID, or a D2D broadcast ID. And when the transmission UE adopts mode 2, the frequency hopping pattern is UE-specific, and the ID may be a related ID of the UE, such as a C-RNTI or another ID uniquely identifying the UE.

Hence, what is different from the related art is that this embodiment that resource for retransmitting a signal is determined based on the frequency hopping pattern, which may randomize the interference between UEs as possible, and may lower complexity of blind detection by the receiver end UE as possible.

According to the current discussion of the D2D communications, from a point of view of the transmitter end UE, whether the resource is assigned by the eNB or is selected and assigned by the UE on its own is determined according to the D2D communications, the D2D communications having two modes, mode 1 and mode 2; for the transmitter end UE with mode 1, the resource used by its D2D communications is configured by the eNB, and for the transmitter end UE with mode 2, the resource used by its D2D communications is selected by the UE on its own.

Furthermore, in the discussion of D2D discovery, the D2D discovery is divided into two types, type1 D2D discovery and type2 D2D discovery. For the type2 D2D discovery, it is further divided into type2A and type2B according to a manner of the eNB for assigning discovery resources.

The type1 D2D discovery refers to that the eNB semi-statically assigns a resource pool for the D2D discovery, the resource pool is common (that is, a common resource pool) to D2D UEs (DUEs); the type2A D2D discovery refers to that the eNB assigns a dynamic UE-specific discovery resource for each time of D2D discovery event of the DUE; and the type2B D2D discovery refers to that the eNB semi-statically assigns UE-specific discovery resources.

In this embodiment, for the first UE adopting different modes to perform D2D communications, the frequency hopping patterns are different; or for the first UE adopting different types to perform D2D discovery, the frequency hopping patterns are different. That is, the frequency hopping patterns adopted by the transmission UEs with different modes in performing D2D communications are mutually independently configured, and the frequency hopping patterns adopted by the transmission UEs in performing different types of D2D discovery are also mutually independently configured.

In an implementation, for the transmitter end UE adopting mode 1 in the D2D communications, it may receive the configuration information for configuring the resource for initially transmitting the signal transmitted by a base station, and the frequency hopping pattern adopted by the transmission UE is cell-specific or common. Furthermore, it may receive a type of the frequency hopping pattern configured by the base station, and then the transmission UE indicates the adopted type of frequency hopping pattern in the SA transmitted to the receiver end UE.

For example, when the eNB assigns the resource for transmitting a signal, resources between multiple UEs may be scheduled by the eNB, hence, the frequency hopping patterns may be cell-specific or common. In this way, the eNB needs only to assign the resource used for initially transmitting the signal, and subsequently, if the signal is transmitted multiple times in a manner of repeatedly transmitting copies or in a manner of retransmission, a resource for retransmitting the copies may be hopped on a basis of the resource for initially transmitting the signal according to the cell-specific (or common) frequency hopping patterns.

Therefore, the eNB stagger resources for initially transmitting signals of different UEs, and frequency hopping is performed based on the cell-specific (or common) frequency hopping patterns in retransmitting the signals, thereby reducing overlapping of the resourced used the by the multiple UEs in retransmitting the signals.

In another implementation, for the transmitter end UE adopting mode 2 in the D2D communications, it may select the configuration information on the resource for initially transmitting the signal on its own, and the frequency hopping pattern used by the transmitter end UE is UE-specific. Furthermore, the transmitter end UE may select a used type of the frequency hopping pattern on its own, and indicates the adopted type of frequency hopping pattern in the SA transmitted to the receiver end UE.

For example, when the UE selects the resource for transmitting the signal on its own, an effect of randomized interference between multiple UEs may be achieved by frequency hopping. The interference randomization is achieved mainly by the resource selected by randomization, hence, the frequency hopping pattern is UE-specific.

Here, when the resource for transmitting the signal selected by the UE on its own is used for signal transmission, it cannot be ensured that the resources used for initial transmission selected by different UEs on their own do not collide, in which case the UE-specific frequency hopping patterns make that subsequently retransmitted (repeatedly transmitting copies) resources may be randomized even though the resources initially transmitted by different UEs collide, thereby lowering a probability of collision of the subsequently retransmitted resources.

In a further implementation, for the transmitter end UE adopting type1 in the D2D discovery, it may select the configuration information on the resource for initially transmitting the signal on its own from a predetermined resource pool. The frequency hopping pattern is UE-specific, and the type of the frequency hopping may be configured together by the eNB or a base station in configuring the resource pool.

In a yet further implementation, for the transmitter end UE adopting type2A or type2B in the D2D discovery, it may receive the configuration information for configuring the resource used for initially transmitting the signal transmitted by a base station. The frequency hopping pattern is cell-specific or common, and the type of the frequency hopping may be configured together by the eNB or a base station in configuring the resource information.

In this embodiment, for different scenarios, different hopping information may be adopted for achieving different goals. For cell-specific (or common) hopping information, when all UEs are repeatedly transmitting signals, resources used for signal retransmission are hopped in the frequency domain according to common hopping patterns; and for UE-specific hopping information, when all UEs are repeatedly transmitting signals, resources used for signal retransmission are hopped in the frequency domain according to UE-specific hopping patterns.

In still another implementation, for the transmitter end UE adopting mode 1 in the D2D communications, when D2D data are transmitted, a position relationship between the resource used for signal retransmission and the resource used for initial transmission may adopt a PUSCH hopping scheme (or hopping type) in an existing specification, i.e. type1 PUSCH hopping and type2 PUSCH hopping.

In particular, when type1 PUSCH hopping is used, according to a value of hopping information $N_{UL\_hop}$ of 1 bit or 2 bits in downlink control information (DCI) used for D2D communications transmitted by the eNB and a size of a system bandwidth, or according to the hopping information $N_{UL\_hop}$ of 1 bit or 2 bits in the DCI used for D2D communications transmitted by the eNB and a size of a resource pool preconfigured for the D2D communications, a hopping offset value of the transmitter end UE for performing frequency domain hopping may be one of three values of $\lfloor N_{RB}^{PUSCH,D2D}/2 \rfloor$ or $\pm \lfloor N_{RB}^{PUSCH,D2D}/4 \rfloor$; where, $N_{RB}^{PUSCH,D2D}$ is different from $N_{RB}^{PUSCH}$ defined in an existing specification (this value denotes the number of PUSCH resource blocks when a cellular UE transmits uplink data and performs PUSCH hopping), and $N_{RB}^{PUSCH,D2D}$ denotes the number of PUSCH resource blocks when a D2D UE in the D2D communications transmits D2D data, and this value may be the size of the preconfigured resource pool.

In assigning the resource to the transmitter end UE, the eNB may indicate the transmitter end UE via signaling a type of hopping in retransmitting or repeatedly transmitting data. And the transmitter end UE may further transmit the type of hopping to the receiver end UE via, for example, scheduling assignment (SA) information.

When a manner similar to type2 PUSCH hopping is used, the resource used by subsequent retransmission is jointly determined by the resource used for initial transmission and a predefined frequency hopping scheme (cell-specific or common). At this moment, the ID may be a cell ID or D2D broadcast ID information. And when a manner similar to type1 PUSCH hopping is used, the resource used by subsequent retransmission by the transmitter end UE is obtained from scheduling grant transmitted by the eNB to the transmitter end UE, and after learning the SA information transmitted by the transmitter end UE, the receiver end UE acquires from the SA information on the resource used by the transmitter end UE in transmitting retransmission data.

In yet another implementation, for the transmitter end UE adopting mode 2 in the D2D communications, when D2D data are transmitted, a position relationship between the resource used for signal retransmission and the resource used for initial transmission may adopt a type2 PUSCH hopping scheme in an existing specification.

In this embodiment, the resource used for the subsequent retransmission is jointly determined by the resource used for initial transmission and a frequency hopping pattern randomly selected from predefined frequency hopping patterns. The resource used for initial transmission and the selected frequency hopping pattern may be indicated in SA information. Furthermore, the resource used for the subsequent retransmission is jointly determined by the resource used for initial transmission and a UE-specific frequency hopping pattern. The resource used for initial transmission and UE-specific ID information determining the UE-specific frequency hopping scheme may be indicated in SA information.

Figure 2:
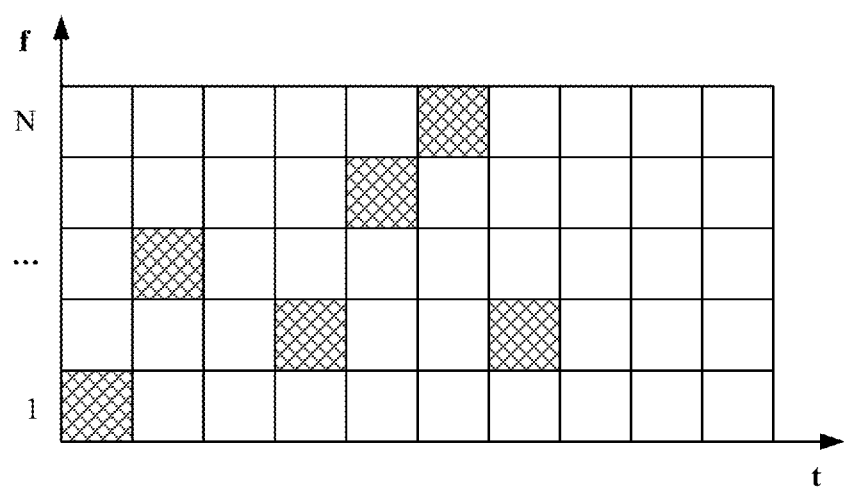
FIG. 2 is a schematic diagram of an example of signal transmission of Embodiment 1 of the present disclosure.

FIG. 2 is a schematic diagram of an example of signal transmission of the embodiment of the present disclosure. As shown in FIG. 2, a resource selected in initial transmission of a signal is #1, and in subsequent retransmission of the signal, resource selection may be performed according to the resource for initial transmission of a signal and a frequency hopping pattern.

In this embodiment, for the receiver end UE, the frequency hopping pattern may be learnt in advance. The resource where the signal retransmission is located may be determined according to the frequency hopping pattern, thereby lowering complexity of blind detection by the receiver end UE as possible.

In particular, the first UE may transmit indication information for determining a retransmission resource to the second UE, so that the second UE receives the retransmitted signal according to the indication information. The indication information for determining a retransmission resource may include: information on a location of the resource for initially transmitting the signal, identification information on UE transmitting the signal, and information on a location of a subframe for retransmitting the signal. However, the present disclosure is not limited thereto, and, for example, some related information may be predefined, and the receiver end UE performs blind detection according to the predefined information.

In an implementation, the indication information for determining a retransmission resource is carried in SA information when the first UE and the second UE perform D2D communications.

In particular, in the D2D communications, the SA information shall be transmitted before transmitting D2D data, contents of the SA information containing scheduling information on some D2D data. The SA information may include: a location of a resource used for initially transmitting the D2D data, information on the transmitter end UE, and information on a location of a subframe for multiple times of transmission of the D2D data. A relationship between the resource used for initial transmission and the resource used for the subsequent transmission is set up by designing a common rule (i.e. a frequency hopping scheme) known to the transmitter end and the receiver end, so that the D2D receiver end UE may, by demodulating the SA information, clearly know a location of a resource for transmitting the D2D data for the first time, and hence derive a location of the resource for the subsequent retransmission/repeated transmission of the signal according to Formula (1) or (2).

In a yet further implementation, the indication information for determining a retransmission resource is carried in a discovery preamble when the first UE and the second UE perform D2D discovery.

In particular, different from the D2D communications, in the D2D discovery, no SA information is transmitted to indicate a location of a resource of a D2D discovery message. However, in the D2D discovery, before a D2D discovery message is transmitted, a discovery preamble may possibly be transmitted, which may assist in demodulating the discovery message. By demodulating the discovery preamble, the information on the ID of the transmitter end UE may be learnt, the information being used to carry UE-specific scrambling information of a PUSCH signal transmitted via the discovery message.

In the D2D discovery, a discovery message occupies a fixed number m of PRBs, and when the configured resource pool contains M PRBs in the frequency domain, there are totally N=M/m pieces of resource unit information. And at this moment, n(i) in Formula (1) or (2) may denote an initial position of the RBs in the frequency domain at this time of retransmission, or may denote in index of a frequency domain resource unit.

It can be seen from the above embodiment that according to the resource for initially transmitting the signal and the frequency hopping pattern, interference between UEs may be randomized as possible, and complexity of blind detection by the receiver end UE may be lowered as possible.

Embodiment 2

Figure 3:
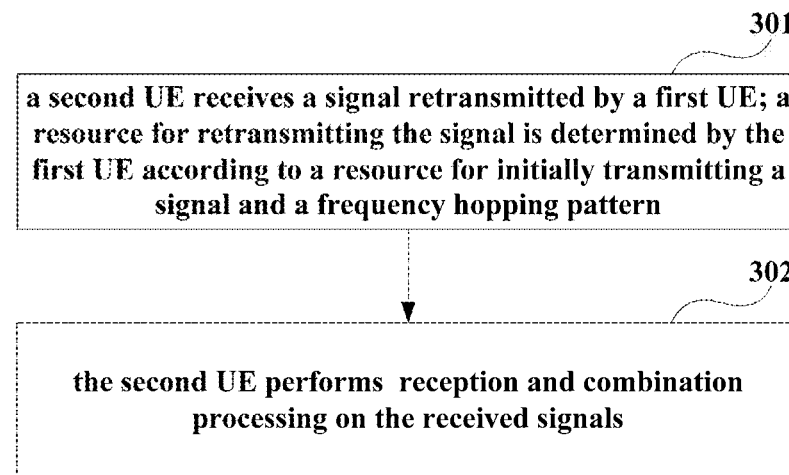
FIG. 3 is a flowchart of the signal retransmission method of Embodiment 2 of the present disclosure.

An embodiment of the present disclosure provides a signal retransmission method, applicable to a second UE as a signal receiver end, with contents identical to those in Embodiment 1 being not going to be described herein any further. FIG. 3 is a flowchart of the signal retransmission method of this embodiment of the present disclosure. As shown in FIG. 3, the method includes:

step 301: a second UE receives a signal retransmitted by a first UE; a resource for retransmitting the signal is determined by the first UE according to a resource for initially transmitting a signal and a frequency hopping pattern.

As shown in FIG. 3, the method may further include:

step 302: the second UE performs reception and combination processing on the received signals. Any method in the relevant art may be used for how to perform the combination, which shall not be described herein any further.

In this embodiment, the second UE may receive indication information for determining a retransmission resource transmitted by the first UE, so that the second UE receives the retransmitted signal according to the indication information. The indication information for determining a retransmission resource may include: information on a location of a resource for initially transmitting the signal, identification information on a UE transmitting the signal, and information on a location of a subframe for retransmitting the signal. However, the present disclosure is not limited thereto. For example, the second UE may further receive the signal by blind detection.

In an implementation, the indication information for determining a retransmission resource is carried in SA information when the first UE and the second UE perform D2D communications.

In another implementation, the indication information for determining a retransmission resource is carried in discovery preamble information when the first UE and the second UE perform D2D discovery. After obtaining the indication information, the UE may adopt the scheme in Formula (1) or (2) to determine a location of the resource where the retransmitted signal is located.

For example, the second UE performs blind detection on discovery preambles in all possible subframes, and once a discovery preamble is correctly detected, a frequency domain position of retransmission/repeated transmission of a subsequent discovery message may be obtained according to Formula (1) or (2), so as to perform reception and combination (such as soft combination). The ID information in Formula (1) or (2) may be obtained from the discovery preamble.

In a further implementation, there exists no discovery preamble when the first UE and the second UE perform D2D discovery. The second UE may perform blind detection at locations of all possible subframes initially transmitting D2D discovery messages, so as to judge whether there exists a transmission message and determine frequency domain locations of the subframes initially transmitting D2D discovery messages, i.e. n(0) in Formula (1) or (2), by detecting a demodulation reference signal (DMRS). Based on the assumption, retransmission/repeated transmission of the subsequent D2D discovery message is demodulated and reception and combination are performed, until a D2D discovery message is correctly demodulated. The ID information in Formula (1) or (2) may be obtained from a DMRS sequence initially transmitting a D2D discovery message, and may also be predefined ID information (for example, multiple IDs may be predefined).

It can be seen from the above embodiment that according to the resource for initially transmitting the signal and the frequency hopping pattern, interference between UEs may be randomized as possible, and complexity of blind detection by the receiver end UE may be lowered as possible.

Embodiment 3

An embodiment of the present disclosure provides a signal retransmission apparatus, configured in a first UE. This embodiment corresponds to the signal retransmission method of Embodiment 1, with identical contents being not going to be described herein any further.

Figure 4:
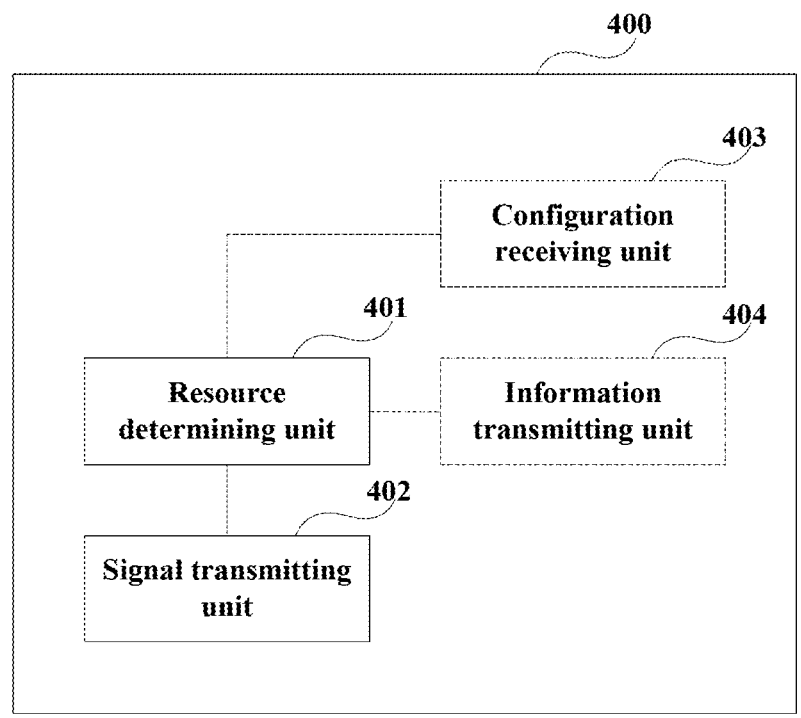
FIG. 4 is a schematic diagram of a structure of the signal retransmission apparatus of Embodiment 3 of the present disclosure.

FIG. 4 is a schematic diagram of a structure of the signal retransmission apparatus of the embodiment of the present disclosure. As shown in FIG. 4, a signal retransmission apparatus 400 includes a resource determining unit 401 and a signal transmitting unit 402. The resource determining unit 401 is configured to determine a resource for retransmitting a signal according to a resource for initially transmitting the signal and a frequency hopping pattern, and the signal transmitting unit 402 is configured to retransmit the signal to a second UE according to the resource determined by the resource determining unit 401.

In this embodiment, for the first UEs using different modes to perform D2D communications, the frequency hopping patterns are different, or for the first UEs using different types to perform D2D discovery, the frequency hopping patterns are different. The frequency hopping patterns may be cell-specific, and may also be UE-specific.

In an implementation, as shown in FIG. 4, the signal retransmission apparatus 400 may further include a configuration receiving unit 403 configured to receive configuration information for configuring the resource for initially transmitting the signal transmitted by a base station in a case where the first UE and the second UE perform D2D communications, or receive configuration information for configuring the resource for initially transmitting the signal transmitted semi-statically or dynamically by the base station in a case where the first UE and the second UE perform D2D discovery.

In another implementation, the resource determining unit 401 may further be configured to select randomly a resource for initially transmitting a signal in a case where the first UE and the second UE perform D2D communications, or select randomly a resource for initially transmitting a signal from a predetermined resource pool in a case where the first UE and the second UE perform D2D discovery.

In a further implementation, the frequency hopping pattern may be information on a PUSCH hopping type.

In a yet further implementation, as shown in FIG. 4, the signal retransmission apparatus 400 may include an information transmitting unit 404 configured to transmit indication information for determining a retransmission resource to the second UE, so that the second UE receives the retransmitted signal according to the indication information.

The indication information for determining a retransmission resource may include: information on a location of a resource for initially transmitting the signal, identification information on a UE transmitting the signal, and information on a location of a subframe for retransmitting the signal. However, the present disclosure is not limited thereto.

In this embodiment, the indication information for determining a retransmission resource is carried in scheduling assignment information when the first UE and the second UE perform D2D communications, or the indication information for determining a retransmission resource is carried in discovery preamble information when the first UE and the second UE perform D2D discovery.

An embodiment of the present disclosure further provides a UE, including the signal retransmission apparatus 400 as described above.

Figure 5:
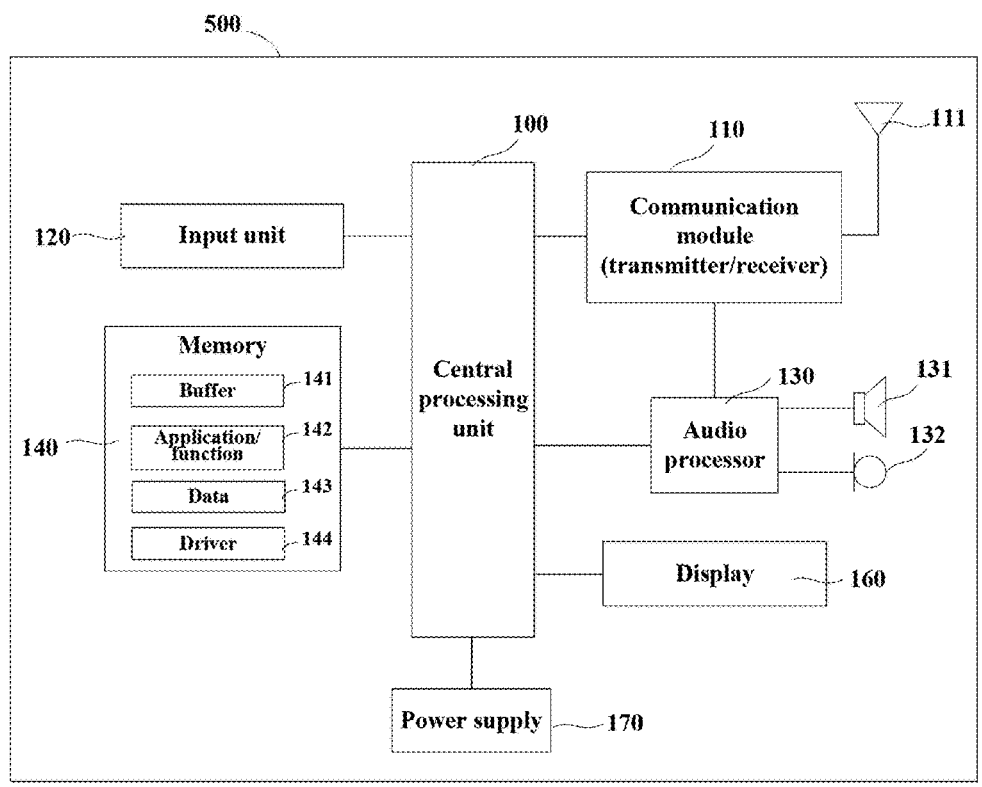
FIG. 5 is a block diagram of a systematic structure of the UE of Embodiment 3 of the present disclosure.

FIG. 5 is a block diagram of a systematic structure of the UE of the embodiment of the present disclosure. As shown in FIG. 5, the UE 500 may include a central processing unit 100 and a memory 140, the memory 140 being coupled to the central processing unit 100. It should be noted that this figure is illustrative only, and other types of structures may also be used, so as to supplement or replace this structure and achieve telecommunications function or other functions.

In an implementation, the functions of the signal retransmission apparatus 400 may be integrated into the central processing unit 100; in this implementation, the central processing unit 100 may be configured to carry out the signal retransmission method as described in Embodiment 1.

In another implementation, the signal retransmission apparatus 400 and the central processing unit 100 may be configured separately. For example, the signal retransmission apparatus 400 may be configured as a chip connected to the central processing unit 100, with its functions being realized under control of the central processing unit 100.

As shown in FIG. 5, the UE 500 may further include a communication module 110, an input unit 120, an audio processor 130, a display 160 and a power supply 170. It should be noted that the UE 500 does not necessarily include all the parts shown in FIG. 5. And furthermore, the UE 500 may include components not shown in FIG. 5, and the related art may be referred to.

As shown in FIG. 5, the central processing unit 100 is sometimes referred to as a controller or control, and may include a microprocessor or other processor devices and/or logic devices. The central processing unit 100 receives input and controls operations of every components of the UE 500.

In this implementation, the memory 140 may be, for example, one or more of a buffer memory, a flash memory, a hard drive, a mobile medium, a volatile memory, a nonvolatile memory, or other suitable devices. It may store information on a failure, and may further store programs executing related information. And the central processing unit 100 may execute the programs stored in the memory 140, so as to realize information storage or processing, etc. Functions of other parts are similar to those of the related art, which shall not be described herein any further. The parts of the UE 500 may be realized by specific hardware, firmware, software, or any combination thereof, without departing from the scope of the present disclosure.

It can be seen from the above embodiment that according to the resource for initially transmitting the signal and the frequency hopping pattern, interference between UEs may be randomized as possible, and complexity of blind detection by the receiver end UE may be lowered as possible.

Embodiment 4

An embodiment of the present disclosure provides a signal retransmission apparatus, configured in a second UE. This embodiment corresponds to the signal retransmission method of Embodiment 2, with identical contents being not going to be described herein any further.

Figure 6:
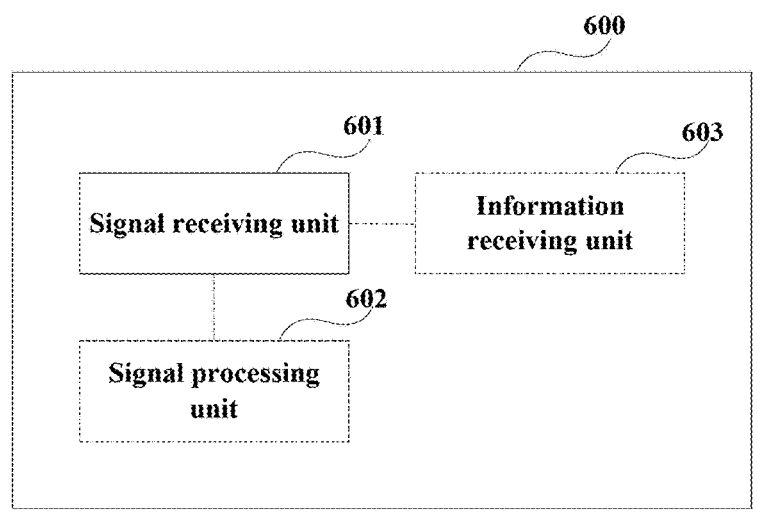
FIG. 6 is a schematic diagram of a structure of the signal retransmission apparatus of Embodiment 4 of the present disclosure.

FIG. 6 is a schematic diagram of a structure of the signal retransmission apparatus of the embodiment of the present disclosure. As shown in FIG. 6, a signal retransmission apparatus 600 includes a signal receiving unit 601 configured to receive a signal retransmitted by a first UE; a resource for retransmitting the signal is determined by the first UE according to a resource for initially transmitting a signal and a frequency hopping pattern.

As shown in FIG. 6, the signal retransmission apparatus 600 may further include a signal processing unit 602 configured to perform reception and combination processing on the received signal.

In an implementation, as shown in FIG. 6, the signal retransmission apparatus 600 may further include an information receiving unit 603 configured to receive indication information for determining a retransmission resource transmitted by the first UE, so that the signal receiving unit is further configured to receive the retransmitted signal according to the indication information.

The indication information for determining a retransmission resource includes: information on a location of a resource for initially transmitting the signal, identification information on a UE transmitting the signal, and information on a location of a subframe for retransmitting the signal. However, the present disclosure is not limited thereto.

In this embodiment, the indication information for determining a retransmission resource is carried in scheduling assignment information when the first UE and the second UE perform D2D communications, or the indication information for determining a retransmission resource is carried in discovery preamble information when the first UE and the second UE perform D2D discovery.

In another implementation, the signal receiving unit 601 is configured to obtain information on a location of the resource where the signal is located by detecting DMRS sequences, and receive the retransmitted signal according to the information on a location.

An embodiment of the present disclosure further provides a UE, including the signal retransmission apparatus 600 as described above. FIG. 5 may be referred to for a structure of the UE.

It can be seen from the above embodiment that according to the resource for initially transmitting the signal and the frequency hopping pattern, interference between UEs may be randomized as possible, and complexity of blind detection by the receiver end UE may be lowered as possible.

Embodiment 5

An embodiment of the present disclosure provides a communication system, with contents identical to those in embodiments 1-4 being not going to be described herein any further.

Figure 7:
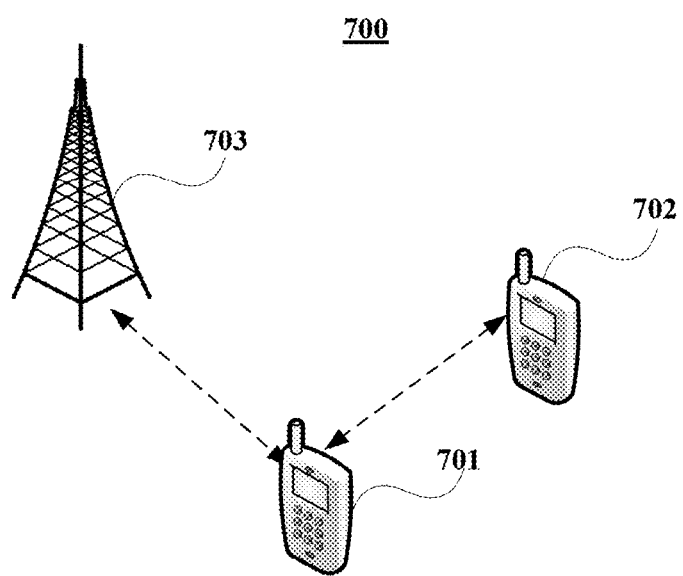
FIG. 7 is a schematic diagram of a structure of the communication system of Embodiment 5 of the present disclosure.

FIG. 7 is a schematic diagram of a structure of the communication system of the embodiment of the present disclosure. As shown in FIG. 7, the communication system 700 includes a first UE 701 and a second UE 702. The first UE 701 is configured to determine a resource for retransmitting a signal according to a resource for initially transmitting the signal and a frequency hopping pattern, and retransmit the signal according to the determined resource, and the second UE 702 is configured to receive the signal retransmitted by the first UE 701.

In this embodiment, the first UE 701 and the second UE 702 are configured to perform D2D communications or D2D discovery. However, the present disclosure is not limited thereto.

In an implementation, as shown in FIG. 7, the communication system 700 may further include a base station 703 configured to configure the first UE 701 with a resource for initially transmitting a signal in a case where the first UE 701 and the second UE 702 perform D2D communications, or configure semi-statically or dynamically the first UE 701 with a resource for initially transmitting a signal in a case where the first UE 701 and the second UE 702 perform D2D discovery.

The frequency hopping pattern may be UE-specific, and may also be cell-specific or common.

An embodiment of the present disclosure further provides a computer-readable program, wherein when the program is executed in a UE, the program enables the UE to carry out the signal retransmission method as described in Embodiment 1 or 2.

An embodiment of the present disclosure further provides a storage medium in which a computer-readable program is stored, wherein the computer-readable program enables a UE to carry out the signal retransmission method as described in Embodiment 1 or 2.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in Figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. A signal transmission apparatus the apparatus, configured in a first User Equipment (UE), comprising:
    a resource determining unit configured to determine, when a first UE repeatedly transmits a signal a given number of times to perform Device-to-Device (D2D) communications or D2D discovery with a second UE, a resource for transmitting the signal in a second and subsequent times within the given number of times according to a randomly selected resource for transmitting the signal in a first time within the given number of times and a frequency hopping pattern;
    a signal transmitting unit configured to transmit the signal to the second UE according to the determined resource; and
    a configuration receiving unit configured to:
        receive configuration information for configuring the resource for transmitting the signal in the first time transmitted by a base station in a case where the first UE and the second UE perform D2D communications, or receive configuration information for configuring the resource for transmitting the signal in the first time transmitted semi-statically or dynamically by the base station in a case where the first UE and the second UE perform D2D discovery, wherein the frequency hopping pattern is cell-specific or common.

2. The signal transmission apparatus according to claim 1, wherein for a plurality of the first UEs performing D2D communications by using different modes, the frequency hopping patterns are different; or for a plurality of the first UEs performing D2D discovery by using different types, the frequency hopping patterns are different.

3. The signal transmission apparatus according to claim 1, wherein the frequency hopping pattern is related to one or more pieces of the following information: information on a location of the resource for transmitting the signal in the first time, identification information on a UE transmitting the signal, and information on a location of a subframe for transmitting the signal.

4. The signal transmission apparatus according to claim 1, wherein the frequency hopping pattern is UE-specific.

5. The signal transmission apparatus according to claim 1, wherein
the resource determining unit is further configured to
select randomly a resource for transmitting a signal in the first time in a case where the first UE and the second UE perform D2D communications, or
select randomly a resource for transmitting a signal in the first time from a predetermined resource pool in a case where the first UE and the second UE perform D2D discovery.

6. A signal transmission apparatus, configured in a first User Equipment (UE), the apparatus comprising:
a resource determining unit configured to determine, when the first UE repeatedly transmits a signal a given number of times to perform Device-to-Device (D2D) communications or D2D discovery with a second User Equipment (UE), a resource for transmitting the signal in a second and subsequent times within the given number of times according to a randomly selected resource for transmitting the signal in a first time within the given number of times and a frequency hopping pattern; and
a signal transmitting unit configured to transmit the signal to the second UE according to the determined resource, wherein
for the first UE performing D2D communications by using a mode 1, the frequency hopping pattern adopts a Physical Uplink Shared Chanel (PUSCH) hopping type 1, or adopts a PUSCH hopping type 2 and the frequency hopping pattern is cell-specific or common; and for the first UE performing D2D communications by using a mode 2, the frequency hopping pattern adopts a PUSCH hopping type 2 and the frequency hopping pattern is UE-specific.

7. A signal transmission apparatus, configured in a first User Equipment (UE), the apparatus comprising:
a resource determining unit configured to determine, when the first UE repeatedly transmits a signal a given number of times to perform Device-to-Device (D2D) communications or D2D discovery with a second User Equipment (UE), a resource for transmitting the signal in a second and subsequent times within the given number of times according to a randomly selected resource for transmitting the signal in a first time within the given number of times and a frequency hopping pattern;
a signal transmitting unit configured to transmit the signal to the second UE according to the determined resource; and
an information transmitting unit configured to transmit indication information for determining a transmission resource to the second UE, so that the second UE receives the transmitted signal according to the indication information,
wherein the indication information for determining a transmission resource comprises: information on a location of a resource for transmitting the signal in the first time; identification information on a UE transmitting the signal; and information on a location of a subframe for transmitting the signal.

8. The signal transmission apparatus according to claim 7, wherein the indication information for determining a transmission resource is carried in scheduling assignment information when the first UE and the second UE perform D2D communications,
or the indication information for determining a transmission resource is carried in discovery preamble information when the first UE and the second UE perform D2D discovery.

9. A signal transmission apparatus, configured in a second User Equipment (UE), the apparatus comprising:
a signal receiver configured to receive, when a first User Equipment (UE) repeatedly transmits a signal a given number of times to perform Device-to-Device (D2D) communications or D2D discovery with the second UE, the signal transmitted by the first UE, wherein
a resource for transmitting the signal in a second and subsequent times within the given number of times is determined by the first UE according to a randomly selected resource for transmitting the signal in a first time within the given number of times and a frequency hopping pattern; and
an information receiving unit configured to receive indication information for determining a transmission resource transmitted by the first UE, so that the signal receiver is configured to receive the transmitting signal according to the indication information,
wherein
the indication information for determining a transmission resource is carried in scheduling assignment information when the first UE and the second UE perform D2D communications,
or the indication information for determining a transmission resource is carried in discovery preamble information when the first UE and the second UE perform D2D discovery.

10. The signal transmission apparatus according to claim 9, wherein the indication information for determining a transmission resource comprises: information on a location of a resource for transmitting the signal in the first time, identification information on a UE transmitting the signal, and information on a location of a subframe for transmitting the signal.

11. The signal transmission apparatus according to claim 9, wherein the receiver is configured to obtain information on a location of the resource where the signal is located by detecting Demodulation Reference Signal (DMRS) sequences, and receive the transmitted signal according to the information on a location.

12. The signal transmission apparatus according to claim 9, wherein the apparatus further comprises:
a signal processing unit configured to perform reception and combination processing on the received signals.

13. A communication system, comprising:
a first User Equipment (UE); and
a second UE, wherein:
the first UE is configured to determine, when the first UE repeatedly transmits a signal a given number of times to perform Device-to-Device (D2D) communications or D2D discovery with the second UE, a resource for transmitting the signal in a second and subsequent times within the given number of times according to a randomly selected resource for transmitting the signal in a first time within the given number of times and a frequency hopping pattern and is configured to transmit the signal according to the determined resource; and
a base station configured to configure the first UE with a resource for transmitting a signal in the first time in a case where the first UE and the second UE perform D2D communications, or configure semi-statically or dynamically the first UE with a resource for transmitting a signal in the first time in a case where the first UE and the second UE perform D2D discovery.

* * * * *